United States Patent [19]

Eremita

[11] Patent Number: 4,955,215
[45] Date of Patent: Sep. 11, 1990

[54] ANTI-THEFT STEERING COLUMN CUFF DEVICE FOR AUTOMOBILES AND THE LIKE

[76] Inventor: Nunzio Eremita, 2 Radcliff Rd., Staten Island, N.Y. 10305

[21] Appl. No.: 422,036

[22] Filed: Oct. 16, 1989

[51] Int. Cl.⁵ .................................. E05B 17/14
[52] U.S. Cl. .............................. 70/18; 70/237; 70/417; 70/428
[58] Field of Search .............. 70/18, 260, 423–428, 70/455, 237, 417, 212

[56] References Cited

U.S. PATENT DOCUMENTS

| 1,304,785 | 5/1919 | McDade et al. | 70/18 |
| 1,483,687 | 2/1924 | Shepard | 70/18 |
| 3,665,738 | 5/1972 | Pescuma et al. | 70/237 X |
| 3,811,303 | 5/1974 | Robertson | 70/237 |
| 4,134,279 | 1/1979 | Ross et al. | 70/18 |
| 4,187,706 | 2/1980 | Hill | 70/428 |
| 4,598,562 | 7/1986 | Freeman | 70/237 |
| 4,726,207 | 2/1988 | Gifford | 70/237 X |

FOREIGN PATENT DOCUMENTS 14647 2/1902 Sweden .................................. 70/18

Primary Examiner—Lloyd A. Gall
Attorney, Agent, or Firm—Richard L. Miller

[57] ABSTRACT

An anti-theft steering column cuff device for automobiles and the like is provided and consists of two box shaped casings which are removable connected and locked to the steering column in which one of the casings covers and protects an ignition switch to prevent an unauthorized person from operating the ignition switch.

2 Claims, 1 Drawing Sheet

ANTI-THEFT STEERING COLUMN CUFF DEVICE FOR AUTOMOBILES AND THE LIKE

BACKGROUND OF THE INVENTION

The instant invention relates generally to security shields for automobile ignition switches and more specifically it relates to an anti-theft steering column cuff device for automobiles and the like.

Numerous security shields for automobile ignition switches have been provided in the prior art that are adapted to prevent perspective thiefs from reaching the ignition switches so as to start the engines and steal the automobiles. For example, U.S. Pat. Nos. 4,008,589 and 4,008,590 are illustrative of such prior art. While these units may be suitable for the particular purpose to which they address, they would not be as suitable for the purpose of the present invention as hereafter described.

SUMMARY OF THE INVENTION

A primary object of the present invention is to provide an anti-theft steering column cuff device for automobile and the like that will overcome the shortcomings of the prior art devices.

Another object is to provide an anti-theft steering column cuff device for automobiles and the like that will cover and protect an ignition switch on the steering column so as to prevent an unauthorized person from operating the ignition switch.

An additional object is to provide an anti-theft steering column cuff device for automobiles and the like that can be attached and removed from the steering column without the use of special tools.

A further object is to provide an anti-theft steering column cuff device for automobiles and the like that is simple and easy to use.

A still further object is to provide an anti-theft steering column cuff device for automobiles and the like that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the instant invention mounted and locked to a steering column of a motor vehicle shown in phantom; and FIG. 2 is a perspective view of the instant invention per se removed from the steering column and separated into two basic parts.

DETAILED DESCRIPTION OF THE PREFERRED EMBODIMENTS

Figure 1:
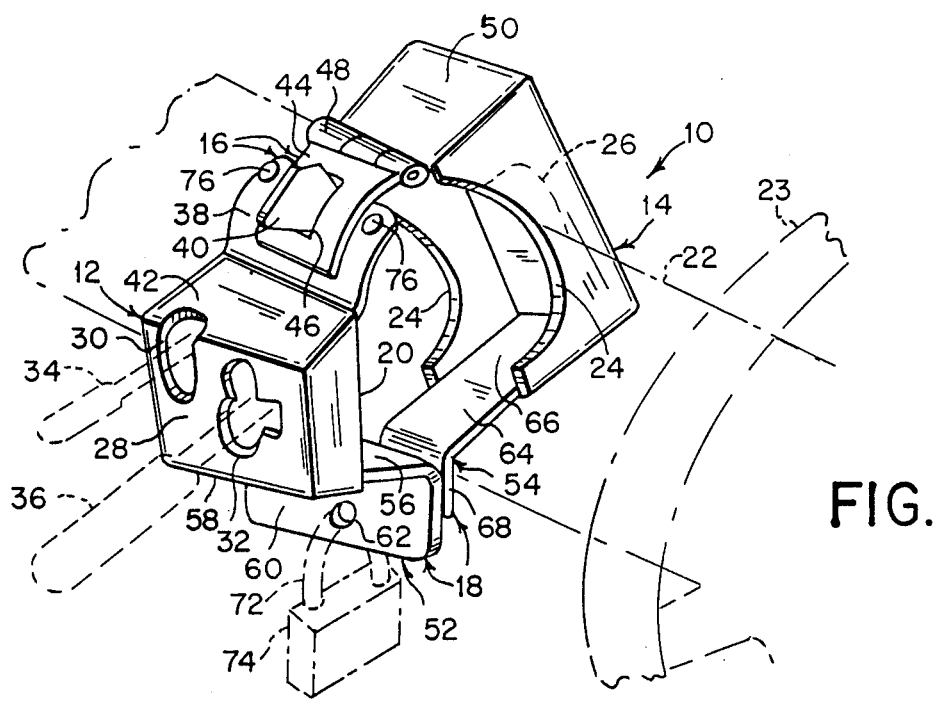
Figure 2:
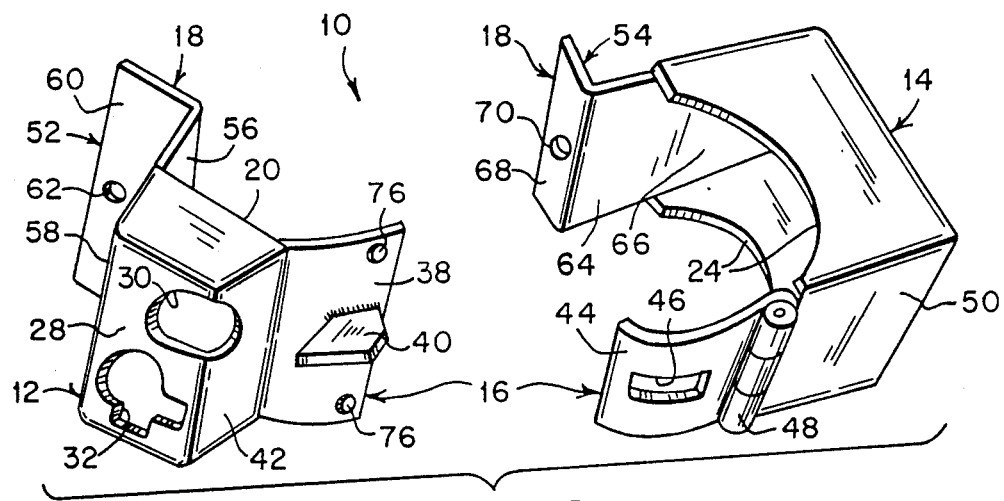

Turning now descriptively to the drawings, in which like reference characters denote like elements throughout the several views, FIGS. 1 and 2 illustrate an anti-theft steering column cuff device 10 for automobiles and the like. The device 10 contains a first box shaped casing 12, a second box shaped casing 14, a hasp member 16 and a locking structure 18.

The first box shaped casing 12 has an open side 20 to fit against one side of a steering column 22 supporting a steering wheel 23. The second box shaped casing 14 has a curved open side 24 to fit against opposite side of the steering column 22 as to cover and protect an ignition switch 26.

The hasp member 16 extends between the first box shaped casing 12 and the second box shaped casing 14 so as to removably connect the first box shaped casing 12 to the second box shaped casing 14 on the steering column 22.

The locking structure 18 extends between the first box shaped casing 12 and the second box shaped casing 14 opposite the hasp member 16 for locking the cuff device 10 to the steering column 22 to prevent an unauthorized person from operating the ignition switch 26.

The first box shaped casing 12 includes a base wall 28 opposite the open side 20 thereof, having two openings 30 and 32 therethrough, so that a tilt lever 34 on the steering column 22 can extend through opening 30 while a signal lever 36 on the steering column 22 can extend through other opening 32.

The hasp member 16 includes a curved plate 38 having a hooked projection 40 thereon. The curved plate 38 is attached to and extends away from an end wall 42 at the open side 20 of the first box shaped casing 12. A curved strap 44 having a slot 46 therethrough is hinged at 48 to an end wall 50 at the open side 24 of the second box shaped casing 14 so that the slot 46 can fit over the hooked projection 40 to be removably connected thereto.

The locking structure 18 includes a first L-shaped bracket 52 and a second L-shaped bracket 54. The first L-shaped bracket 52 contains a first straight arm 56 forming a continuance of an opposite end wall 58 of the first box shaped casing 12, while a second straight arm 60 having an aperture 62 therethrough extends at an angle away from the steering column 22. The second L-shaped bracket 54 contains a first straight arm 64 forming a continuance of an opposite end wall 66 of the second box shaped casing 14, while a second straight arm 68 having an aperture therethrough extends at an angle away from the steering column 22 so that a shackle 72 of a padlock 74 can extend through both of the apertures 62 and 70 and lock the L-shaped brackets 52 and 54 together about the steering column 22.

In operative use, the first box shaped casing 12 is fitted against the side of the steering column 22 with tilt lever 34 the signal lever 36 extending through openings 30 and 32. The slot 46 is then placed over the hooked projection 40 so that the second box shaped casing 14 can swing down to cover and protect the ignition switch 26. The shackle 72 of the padlock 74 is then placed through the apertures 62 and 70 to lock the L-shaped brackets 52 and 54 together. To open the cuff device 10 the padlock 74 is removed so that the second box shaped casing 14 can be swung up and removed to expose the ignition switch 26.

The cuff device 10 can be typically fabricated out of durable stainless steel material. Rubber bumpers 76 can also be provided on the curved plate 38 to properly position the first box shaped casing 12 on the steering column 22 and prevent damage thereto.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An anti-theft cuff device for a motor vehicle having a steering wheel and a steering column with an ignition switch, said device comprising:
   (a) a first box shaped casing having an open side to fit against one side of the steering column;
   (b) a second box shaped casing having a curved open side to fit against opposite side of the steering column so as to cover and protect the ignition switch;
   (c) a hasp member extending between said first box shaped casing and said second box shaped casing so as to removably connect said first box shaped casing to said second box shaped casing on the steering column, wherein said hasp member includes:
      (i) a curved plate having a hooked projection thereon, said curved plate being attached to and extending away from an end wall at said open side of said first box shaped casing; and
      (ii) a curved strap having a slot therethrough and hinged to an end wall at said open side of said second box shaped casing so that said slot can fit over said hooked projection to be removably connected thereto; and
   (d) means extending between said first box shaped casing and said second box shaped casing opposite said hasp member, for locking said cuff device to the steering column to prevent an unauthorized person from operating the ignition switch, wherein said first box shaped casing includes a base wall, opposite said open side thereof, having two openings therethrough, so that a tilt lever on the steering column can extend through one of said openings while a signal lever on the steering column can extend through the other of said openings.

2. An anti-theft cuff device as recited in claim 1, wherein said locking means includes:
   (a) a first L-shaped bracket with a first straight arm forming a continuance of an opposite end wall of said first box shaped casing, while a second straight arm having an aperture therethrough extends at an angle away from the steering column; and
   (b) a second L-shaped bracket with a first straight arm forming a continuance of an opposite end wall of said second box shaped casing, while a second straight arm having an aperture therethrough extends at an angle away from the steering column so that a shackle of a padlock can extend through both of said apertures and lock said L-shaped brackets together about the steering column.

* * * * *